(12) United States Patent
Harrelson, III

(10) Patent No.: US 6,182,974 B1
(45) Date of Patent: *Feb. 6, 2001

(54) STUFFING BOX PACKING ASSEMBLY

(75) Inventor: Albert L. Harrelson, III, Marion, NY (US)

(73) Assignee: Garlock, Inc.

( * ) Notice: Under 35 U.S.C. 154(b), the term of this patent shall be extended for 0 days.

This patent is subject to a terminal disclaimer.

(21) Appl. No.: 09/152,768

(22) Filed: Sep. 14, 1998

Related U.S. Application Data (63) Continuation-in-part of application No. 08/620,406, filed on Mar. 22, 1996, now Pat. No. 5,806,858.

(51) Int. Cl.$^7$ ................................................ F16J 15/20
(52) U.S. Cl. ...................... 277/537; 277/531; 277/539; 277/548
(58) Field of Search ................................ 277/531, 535, 277/537, 539, 548, 528, 534, 536, 935, 938, 939

(56) References Cited

U.S. PATENT DOCUMENTS

| | | |
|---|---|---|
| 4,256,317 | 3/1981 | Havens et al. . |
| 4,298,562 | 11/1981 | Latty . |
| 4,328,974 | 5/1982 | White et al. . |
| 5,134,030 | 7/1992 | Ueda et al. . |
| 5,225,262 | 7/1993 | Leduc . |
| 5,228,701 | 7/1993 | Greinke et al. . |
| 5,240,769 | 8/1993 | Ueda et al. . |
| 5,370,405 | 12/1994 | Ueda . |
| 5,419,568 | * 5/1995 | Champlin ............................. 277/123 |
| 5,522,603 | * 6/1996 | Naitou et al. ........................ 277/102 |
| 5,806,858 | 9/1998 | Harrelson, III . |

FOREIGN PATENT DOCUMENTS

| | | |
|---|---|---|
| 0 227 474 | 12/1986 | (EP) . |
| 2 287 772 | 9/1995 | (GB) . |
| WO 97/35129 | 9/1997 | (WO) . |

* cited by examiner

Primary Examiner—Daniel G. DePumpo
(74) Attorney, Agent, or Firm—Cummings & Lockwood

(57) ABSTRACT

Compact stuffing box packing assemblies of the present application include high density metal inserted braided end rings of graphite which have each been die formed to have angled facing surfaces and a plurality of center Preform rings is disclosed In one embodiment, three low density graphite Preform rings having angled facing surfaces are contained between the high density braided end rings. The facing surfaces of the Preform rings extend at a different angle relative to the longitudinal axis of the packing assembly than do the facing surfaces of the braided end rings. The braided end rings provide a support function for the Preform rings as well as a stem wiping function. In another embodiment, additional Preform support rings made of the same material as the end rings are positioned between the low density Preform rings. A further embodiment disclosed includes replacing two of the three low density graphite Preform rings having angled facing surfaces with Preform support rings made of high density metal inserted braided end rings of graphite which have each been die formed to have angled facing surfaces. A still further embodiment includes having the end rings and the center rings made of high density metal inserted braided end rings of graphite which have each been die formed to have angled facing surfaces.

30 Claims, 2 Drawing Sheets

FIG_1 PRIOR ART

FIG_2 PRIOR ART

FIG_3 PRIOR ART

FIG_4

STUFFING BOX PACKING ASSEMBLY

RELATED APPLICATION

This application is a continuation-in-part of commonly owned U.S. patent application Ser. No. 08/620,406, filed Mar. 22, 1996, of Harrelson, now U.S. Pat. No. 5,806,858 the disclosure of which is herein incorporated by reference.

BACKGROUND OF THE INVENTION

The present invention relates generally to stuffing box packing assemblies for valve stems, shafts and piston rods, and more particularly to improved designs for conventional sized five ring stuffing box packing assemblies including a high density compact five ring stuffing box packing assembly.

Figure 1:
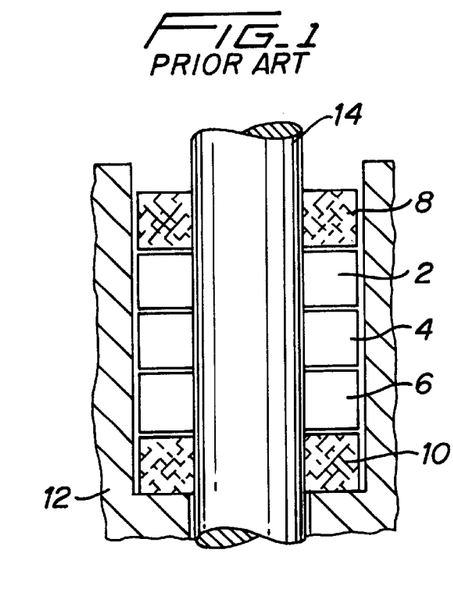
FIG. 1 is a cross sectional view through a stuffing box, stem and a flat five ring stuffing box packing assembly of the prior art.

In the past, the five-ring stuffing box packing assembly shown in cross section in FIG. 1 has been used in stuffing boxes for valves where high performance results are not required. This five-ring stuffing box packing assembly is a flat combination set consisting of three graphite die-formed tape rings 2, 4 and 6 placed together in the center of the set with braided end-rings 8 and 10 being positioned at the top and bottom of the five-ring set. These five rings are mounted in a stuffing box 12 for sealing a valve stem 14. Graphite die-formed tape rings are low density rings formed from flexible graphite tape which are deformed against the stuffing box or valve stem when a gland (not shown) is tightened. These graphite die-formed tape rings are typically produced at a density of about 1.1 g/cc. A graphite tape having a density of about 0.7 g/cc density is the lowest flexible graphite tape density known to the inventor of the present application that a manufacturer can purchase to produce flexible graphite tape rings. A 0.7 g/cc finished ring is simply a spiral wrapping of the 0.7 g/cc flexible graphite tape with the tape ends adhered in place. In many cases, these rings must be split to facilitate installation into a valve stuffing box. If the ring is a spiral wrapping only of flexible graphite tape, cutting through one side of a ring to enable it to be slipped around a valve stem causes the individual tape wrappings to delaminate and separate. However, if the spiral wrapping of tape is compressed in a die-forming operation under a comparatively low amount of pressure, the tape wrappings form an accordion fold-type bond between the individual layers that enables the rings to be easily split and handled for installation purposes. Compression of the tape in the die forming operation increases the density of the die formed ring to a level above about 0.7 g/cc, normally about 1.1 g/cc.

Flexible graphite has a negative functional attribute in that it will extrude through fine clearances as a result of heavy compressive forces. To control and prevent extrusion, the anti-extrusion braided end rings 8 and 10 were conventionally positioned outside the flexible graphite rings 2, 4 and 6. These braided end rings are often formed from a soft carbon fiber braided packing material.

The five-ring "flat" combination packing assembly arrangements are very simple and easy to assemble. All components are square in cross-sectional shape, and it is a well known principle in industry that the three graphite die-formed tape rings are placed together in the center of the packing assembly with the braided end-rings being positioned at the top and bottom ends. As a result of the widespread use of the five-ring flat combination packing assembly, many valve designs in the industry are adapted for use with a stuffing box depth sufficient to accommodate only the five packing ring cross sections of the five ring flat combination. This stuffing box depth is presently the predominant market trend.

Although the flat, five ring stuffing box packing assembly is simple and easy to manufacture and install, it has limitations in expansion efficiency, resistance to abrasive damage caused by stem scale build up, valve stem friction and sealability properties.

The stuffing box packing assembly of U.S. Pat. No. 4,328,974 to Richard E. White et al., the disclosure of which is herein incorporated by reference, was developed to provide enhanced radial expansion and sealability characteristics for valves, such as petrochemical and power industry valves where high performance results are required. This eleven ring packing assembly, shown in cross section in FIG. 2, incorporates uniquely designed low density graphite Preform rings 14 and 16 mated to higher density graphite Adapter rings 18 and 20 in such a way that one pair of these rings has its radial expansion properties oriented toward the outside sealing surface, and the other pair of rings is likewise oriented toward the inside sealing surface. The Adapter and Preform rings are composed of flexible graphite tape layered in either a spiral-wrapped or a laminated format before die-forming. The adjacent mating face surface angles 22 and 24 of the Preform and Adapter rings are typically 45 degrees and 60 degrees respectively. The combination effect of mating differing density material at differing angles is to enhance the radial expansion characteristics of the packing assembly. This enhanced radial expansion ability enables a single packing assembly to cover a wider range of cross-sectional stuffing box clearances than would be possible with more conventional designs, and the enhanced expansion ability also leads to a higher degree of sealing efficiency.

Figure 2:
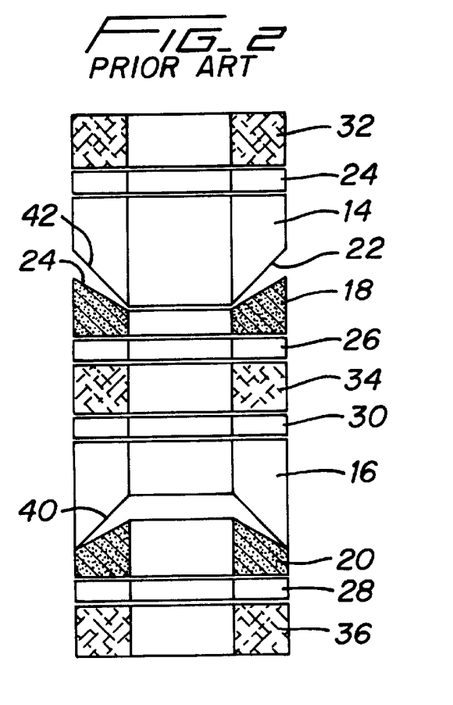
FIG. 2 is a cross sectional view of a prior art eleven ring stuffing box packing assembly of the prior art.

The Preform 14, 16 and Adapter 18, 20 rings are composed of graphite, usually and typically of the flexible graphite tape material type. The Preforms 14, 16 have a density range of about 0.5 to about 1.4 g/cc. The Adapter rings 18, 20 have a density range of about 1.4 to about 1.7 g/cc. The remaining seven rings are present to provide important supporting functions. The four metal or GYLON® spacer rings 25, 26, 28 and 30 ensure that loading forces are distributed evenly around the compression surfaces of the paired Preform 14, 16 and Adapter rings 18, 20. The three braided rings 32, 34 and 36, positioned at the top, the center, and in the bottom of the packing assembly, are present to perform collectively as resiliency rings, anti-extrusion rings, and wiper rings. The braided rings 32, 34, 36 are compressible carbon or graphite braided material.

U.S. Pat. No. 4,328,974 also discloses an alternate seven ring packing assembly shown in cross section in FIG. 3. The principal difference of the seven ring packing assembly from the eleven ring packing assembly of FIG. 2, is that the Preform rings 14 and 16 have been combined into a single, reduced height Preform ring 38 which contains both the OD and ID angled face features 40 and 42 respectively of the Preform rings 14 and 16. The consolidation of the two Preform rings (14, 16) of FIG. 2 into the single ring 38 eliminates the need for two of the spacer rings (25, 26, 28, 30) and one of the braided rings (32, 34, 36) of FIG. 2. Thus, in addition to the Preform ring 38, the seven ring packing assembly has two flexible graphite Adapter rings 44 and 46, two spacer rings 48 and 50, and two compressible braided carbon or graphite rings 52 and 54. The seven ring packing assembly of FIG. 3 can be used to seal valves that have shallower stuffing boxes than would be possible with eleven ring assemblies. This feature of being able to seal the shallower stuffing boxes, however, was obtained with a compromise in sealing effectiveness. The reduced amount of Preform ring material used in this approach also reduced the seven ring packing assembly's comparative sealing effectiveness.

The eleven and seven ring assemblies of U.S. Pat. No. 4,328,974, in side-by-side comparative functional testing with the flat five-ring packing assembly of FIG. 1, have proven to be the best functional product for use in critical process valves where leakage could lead to significant process unit down-time or environmentally hazardous conditions. However, the complexity, cost, packing assembly height and installation requirements of the eleven and seven ring assemblies have proven disadvantageous.

SUMMARY OF THE INVENTION

It is a primary object of the present invention to provide a novel and improved compact stuffing box packing assembly adapted for a one step installation and compression procedure in a conventionally sized five ring stuffing box.

Another object of the present invention is to provide a novel and improved compact stuffing box packing assembly having enhanced sealability and radial expansion capabilities which adapts the packing assembly for use in valves having a conventionally sized five ring stuffing box where high performance results are required.

Yet another object of the present invention is to provide a novel and improved compact stuffing box packing assembly having high density, metal-inserted, braided end rings having a high resistance to extrusion and abrasion in a conventionally sized five ring stuffing box.

A further object of the present invention is to provide a novel and improved compact stuffing box packing assembly having high density braided end rings having a density of at least about 1.8 g/cc in a conventionally sized five ring stuffing box.

A still further object of the present invention is to provide a novel and improved compact stuffing box packing assembly having high density metal inserted braided end rings of graphite which have each been die formed to have angled facing surfaces in a conventionally sized five ring stuffing box.

In accordance with these and further objects, one aspect of the present invention includes a packing for a stuffing box comprising: at least one center ring; and an end ring, responsive when axial compressive force is applied to the packing, for forcing the material adjacent one radial edge of a first end of one the at least one center ring to move axially and radially in a direction away from the at least one center ring and for further compressing the material into an impervious and effective seal, the end ring comprising: braided graphite tape stock having a density of at least about 1.8 g/cc; and inserts, operatively dispersed throughout the braided graphite tape stock.

Another aspect of the present invention includes a packing assembly for a stuffing box comprising: at least two low density center rings; at least one additional ring operatively positioned therebetween, the at least one additional ring comprising: braided graphite tape stock having a density of at least about 1.8 g/cc; and inserts, operatively dispersed throughout the braided graphite tape stock having angled facing surfaces; and an end ring, responsive when axial compressive force is applied to the packing, for forcing the material adjacent one radial edge of a first end of one of the at least two low density center rings to move axially and radially in a direction away from one of the at least two center rings and for further compressing the material into an impervious and effective seal, the end ring comprising: braided graphite tape stock having a density of at least about 1.8 g/cc; and inserts, operatively dispersed throughout the braided graphite tape stock.

Yet another aspect of the present invention includes a packing assembly for a stuffing box comprising: at least three low density graphite perform rings having angled facing surfaces operatively positioned between two end rings; at least one additional ring operatively positioned between adjacent low density Preform rings, the at least one additional ring comprising: braided graphite tape stock having a density of at least about 1.8 g/cc; and inserts, operatively dispersed throughout the braided graphite tape stock having angled facing surfaces; and an end ring, responsive when axial compressive force is applied to the packing, for forcing the material adjacent one radial edge of a first end of one of the at least three low density center rings to move axially and radially in a direction away from one of the at least three center rings and for further compressing the material into an impervious and effective seal, the end ring comprising: braided graphite tape stock having a density of at least about 1.8 g/cc; and inserts, operatively dispersed throughout the braided graphite tape stock.

A still further aspect of the present invention includes a packing assembly for a stuffing box comprising: a center ring assembly, the center ring assembly comprising: one low density graphite perform ring having angled facing surfaces; two Preform support rings, the low density graphite perform ring being operatively positioned between the two Preform support rings, the two Preform support rings comprising: braided graphite tape stock having a density of at least about 1.8 g/cc; and inserts, operatively dispersed throughout the braided graphite tape stock; and an end ring, responsive when axial compressive force is applied to the packing, for compressing the material into an impervious and effective seal, the end ring comprising: braided graphite tape stock having a density of at least about 1.8 g/cc; and inserts, operatively dispersed throughout the braided graphite tape stock Other objects and advantages of the invention will be apparent from the following description, the accompanying drawings and the appended claims.

DETAILED DESCRIPTION OF THE INVENTION

Figure 3:
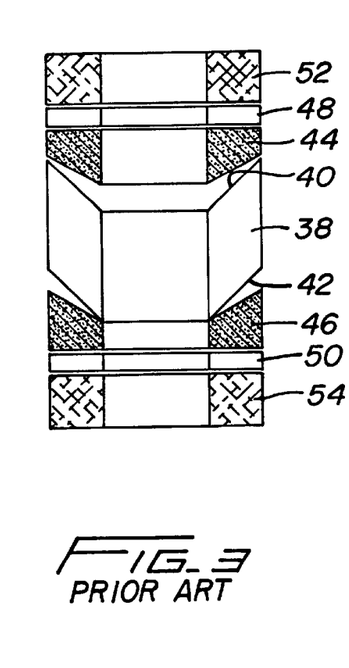
FIG. 3 is a cross sectional view of a prior art seven ring stuffing box packing assembly of the prior art.
Figure 4:
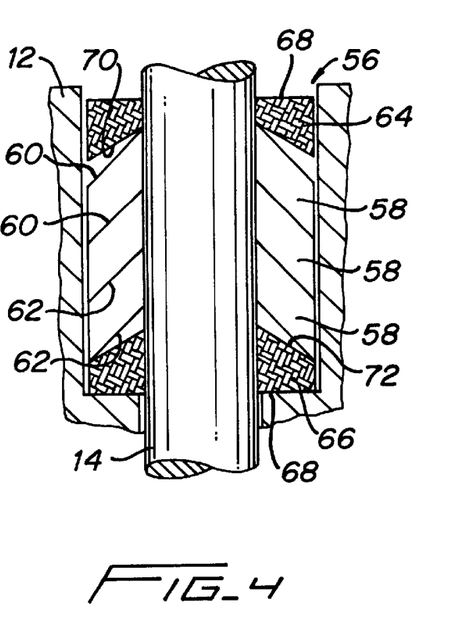
FIG. 4 is a cross sectional view through a stuffing box, stem and a five ring stuffing box packing assembly of the present invention.

With reference to FIG. 4, one embodiment of a conventional sized five ring stuffing box packing assembly 56 of the present invention is shown mounted in the conventionally sized five ring stuffing box 12 of FIG. 1. As in the seven ring packing assembly of FIG. 3, the five ring stuffing box packing assembly 56 includes three die formed flexible graphite tape, low density Preform rings 58 (each being about the same thickness as the Preform 38 of FIG. 3) having a density within a range of from about 0.5 to about 1.4 g/cc. These Preform rings 58 can be separate rings, as shown, each having opposed outer surfaces 60 and 62 that extend at the same acute angle to the longitudinal axis of the stuffing box packing assembly 56 along which the valve stem 14 extends. When the three Preform rings 58 are used, the three rings nest, and the outermost surfaces 60 and 62 of the two end rings form ID and OD angled face features respectively for the Preform ring assembly. Thus, the outermost surface 60 extends at an acute angle to the longitudinal axis of the packing assembly the axially inner direction and the outermost surface 62 extends at an acute angle to the longitudinal axis of the packing assembly the axially outer direction, both at an angle of about 45 degrees.

With the prior art packing assemblies of FIGS. 2 and 3, it was found to be desirable to maintain as wide a difference as possible in the densities of the Preform rings and the Adapter rings. The differing densities, along with the differing angles of these two component parts, was believed to be the source of the enhanced sealability and radial expansion capabilities of the packing assembly. As the packing assembly is compressed, the Preforms 14, 16, 38 will expand to form a seal, but this compression also necessarily increases the density of the Preform ring components themselves. The enhanced radial expansion and sealability properties will continue to occur as a result of later applied compression until such time that the density of the Preform ring has attained and matched the density level of the Adapter ring. At this point, when the Preform and Adapter ring densities are the same, the packing assembly will continue to function only comparably to the conventional combination flat-ring packing assembly of FIG. 1. To enhance the performance and increase the service life of the prior art packing assemblies of FIGS. 2 and 3, the Preform density value was adjusted to a typical value of about 1.1 g/cc and the Adapter ring densities were adjusted to a maximum value of about 1.7 g/cc. An Adapter ring density of about 1.7 g/cc represents the maximum practical density limit that flexible graphite tape can be compressed to attain in a die-formed ring form.

To achieve the illustrated five ring stuffing box packing assembly 56 of FIG. 4, it was necessary to perform the functions of the Adapter rings 44 and 46, the support functions of the spacer rings 48 and 50 and the wiper functions of the compressible braided carbon or graphite rings 52 and 54 of FIG. 3 with only two additional rings. It was found that metal-inserted conformable braided stock (hereafter referred to as MIC-braid) composed (preferably) of pure flexible graphite tape, into which has been inserted or included strips, wires, filaments, tinsels, etc., of metal, or other material capable of performing the support spacer and wiper functions, was able to accomplish the support spacer and wiper functions. While MIC braid with Inconel™ metal nickel-chromium alloy stainless steel inserts of the type sold as packing 1303 by Garlock Industrial Packing Products, Sodus, N.Y. is presently the most preferred choice, other metallic insert choices (such as steel, copper, brass, aluminum, zinc, etc.) can be used as well. Due to the metallic inserts, the MIC-braids are unusually versatile in being able to be die-formed into various shapes, sizes, angles, etc. The metal inserts rigidly hold and conform the finished die-formed MIC-braid rings into virtually any desired shape.

Die-forming trials were conducted to determine the maximum density that MIC-braided rings could be produced to attain. The trial results demonstrated that MIC-braid die-formed rings were possible having a density as high as about 2.60+g/cc, much higher than the maximum about 1.7 g/cc density attainable with graphite tape Adapter rings 18, 20, 44, 46. The three Preform rings 58 (having a combined stack height of three cross-sections) are a necessary part of maintaining the high performance levels desired for the packing assembly 56. The Preforms 58 must have a shaped ring 64, 66 on either end to develop the enhanced radial expansion flow of the Preform ring 58 material during compression. However, it is also necessary to provide rigid support for the Preforms, and finally, compressible braided carbon or graphite end-rings are also a necessary component in that they perform anti-extrusion and wiping functions. To provide two end rings 64 and 66 having all of these attributes, the end rings 64, 66 are MIC braids using graphite in tape form. One of the benefits of using graphite in tape form is that, when die-formed, it presents a smooth low-friction surface for mating contact. When the end ring's high density surface 70, 72 contacts the Preform ring's low density surface 60, 62 under a heavy compressive loading force, the end ring's surface 70, 72 must be smooth and relatively slippery to encourage the outward or inward sliding and slippage of the soft Preform 58 material. If the end ring surface 70, 72 had the rougher surface texture that is common with most conventional die-formed braided forms, the resultant friction would eliminate most of the expansion qualities of the packing assembly. The contact between the rough end ring surface 70 and the Preform material would hold the Preform material at its contact point and bind it up.

Since radial expansion is the primary finction of the Preform rings 58, the rigidity of the die-formed MIC-braided rings is not a disadvantage at all, but is, in fact, an advantage. Being very rigid, these end rings 64, 66 will remain unaffected by compressive loading forces, and will maintain a smooth contact surface 70, 72 to a better degree than would be possible with conventional flexible graphite tape Adapters (18, 20, 44, 46) and will provide support for the Preform rings 58. Each end ring 64 and 66 is die-formed with an outer surface 68 which extends at, presently preferably, approximately a 90 degree angle to the longitudinal axis of the packing assembly, presently preferably, a 60 degree angled inner surface. The inner surface 70 of the end ring 64 extends at an acute angle of about 60 degrees to the longitudinal axis of the packing assembly and operates with the angled surface 60 of the top Preform ring to form the ID angled face feature. Similarly, the inner surface 72 of the end ring 66 extends at an angle of about 60 degrees to the longitudinal axis of the packing assembly operates with the angled surface 62 of the bottom Preform ring to form the OD angled face feature. The metal component in the MIC-braided end rings 64, 66 cause the end rings to hold their shape when subjected to compression by a packing gland (not shown), and as previously discussed, the greater the density range between the density of the end rings 64 and 66 and the Preform rings 58, the greater the range of enhanced radial expansion and sealability properties for the resulting packing assembly 56.

While the MIC-braid forming the end rings 64 and 66 has a significant flexible graphite content and has the smooth surface finishes that are characteristic of pure flexible graphite die-formed tape rings, its metal-inserted braided structure ensures that the ring resists extrusion. The MIC-braided material is also an unusually effective wiper ring material. Flexible graphite tape material has an affinity to attach itself in particle form to metal surfaces. If a wiper ring is not positioned above and below the Preform rings, particles of graphite would attach itself to the stem 14 and be transported out of the stuffing box as the stem is actuated to its opened and closed positions. The resultant loss of graphite material from the flexible graphite Preform rings 58 would quickly lead to the development of leakage paths through the packing assembly set 56. In testing conducted, the MIC-braided end-rings 64, 66 have shown the capability to keep the stem 14 wiped measurably entirely clean with little if any loss of graphite material from the Preforms 58.

As is known, graphite has a natural affinity for metal surfaces in that it has a tendency to attach itself to metal surfaces and fill in the little grooves in the metal. In what is referred to as rising stems, the stems go through either a reciprocating or a vertical helical motion, all parts of the stem are moved past the wiper ring eventually, and that keeps the graphite material wiped off the stem and also keeps the graphite material contained within the stuffing box so that the graphite can continue to do perform the sealing function. If there were no end rings, then the graphite would be transported out of the stuffing box and probably be scraped off or blown off the stem as a result of winds or contact with the internal surfaces of the valve bonnet enclosure, the outside top surface of the packing follower, or any other mechanical part that a stem may contact. Such loss of graphite would eventually cause the seal to be lost and would require maintenance personnel to continuously go to the valve and make adjustments.

The metal insert material in the MIC-braided end rings acts a non-abrasive scraper on the valve stem 14 surface. In some field applications, the media or outside environment creates a scale build-up on the metal stem surface. These applications are especially difficult to seal successfully due to the cutting properties of this scale as the valve stem is actuated through the packing assembly set 56. This scale/debris build-up easily slices grooves through conventional compressible braided carbon or graphite end-rings (8, 10, 32, 34, 36, 52, 54). However, the inherent abrasion resistance and toughness of the MIC-braided end rings 64 and 66 removes scale and resists the grooving action of scale.

The five ring stuffing box packing assembly 56 of FIG. 4 has been tested by a number of methods that serve to indicate that it provides significant advantages over the prior art packing assemblies of FIG. 1–3.

1) Comparative Standard Emission Testing

This test involved subjecting the packing assembly to a valve functional test where the media exposure was 750 F./500 psi Helium. The stem 14 is cycled through 500 complete actuations/day for a period of three days. The hot test period or thermal cycle is experienced for six hours of each day—yielding a total of three thermal cycles. This test procedure is a very difficult test of a product's functional performance capabilities. The following are the results from testing conducted on the conventional seven-ring packing assembly (FIG. 3), the five-ring packing assembly 56 (FIG. 4), and a five-ring flat combination-type packing assembly (FIG. 1).

| Style | Average Stem Friction Forces | Adjustments | Maximum Leakage | Installation Steps | Gland Load (psi) |
| --- | --- | --- | --- | --- | --- |
| 7 ring (FIG. 3) | 658 | 0 | 0 ppm | 2 | 3800 |
| 5 ring 56 (FIG. 4) | 519 | 0 | 0 ppm | 1 | 3800 |
| 5 ring Flat (FIG. 1) | 1014 | 1 | 800 ppm | 2 | 3800 |

All three of the above products were compressed under the same gland loading forces (3800 psi) so that performance comparisons could be drawn. The prior art seven-ring packing assembly and the five-ring flat conventional combination-type packing assembly were installed using two-step installations. A two-step installation yields the best performance, but consumes a greater amount of time. The new five-ring packing assembly 56 used a one-step procedure for installation. Both assemblies designs of FIGS. 3 and 4 had 0 ppm leakage detectable throughout the test procedure, while the five-ring flat combination-type packing assembly of FIG. 1 had seven (7) leakage points detected with a maximum leakage level recorded of 800 ppm. Neither the packing assembly of FIG. 3 or the five ring packing assembly of FIG. 4 required any follow-up adjustments during the test, while the five-ring flat combination-type packing assembly of FIG. 1 required one adjustment to maintain leakage levels below the 500 ppm goal (Clean Air Act legislation limit). A measurement of the stem frictional forces, which is of critical concern to the control valve industry, showed that the five-ring packing assembly 56 had a 21.2% lower average friction than the seven-ring packing assembly of FIG. 3 and 48.8% less friction than the five-ring conventional combination packing assembly design of FIG. 1.

Summary: The five-ring design stuffing box packing assembly 56 (with metal-inserted conformable braided end rings 64 and 66) matched the sealability performance of the seven-ring assembly (FIG. 3), and significantly outperformed the five-ring conventional assembly (FIG. 1). The five-ring packing assembly 56 of FIG. 4 also significantly outperformed both of the other packing assemblies in its lower stem friction results.

About 3800 psi is the minimal amount of gland loading required to get favorable results in emission testing exercises with the prior art seven and eleven ring assemblies and with the conventional prior art combination five-ring flat assemblies. The compressible braided carbon or graphite fiber end-rings that are conventionally used with the prior art assemblies are relatively soft and flexible. When compressed in a valve stuffing box, the applied gland loading forces quickly cause these compressible braided end-rings to expand where they come into firm contact against the stem and box bore surfaces. As the loading forces increase to about 3800 psi, the top braided compressible end-ring (8, 32, 52) develops a strong frictional grip on the valve stem 14 surface. This frictional grip prevents some of the loading forces from being effectively transmitted down through the end-ring to the sealing rings (2, 4, 6, 14, 16, 38) located in the center of the packing assembly.

The MIC-braid, die-formed into a high density end ring 64 or 66 does not have the soft resiliency of compressible braided carbons. While the end rings 64 and 66 will form a contact sufficient to act as an effective wiper/anti-extrusion ring, the MIC-braided ring is much too rigid to create a hard frictional grip against the stem surface as a result of heavy applied loads. The lack of frictional grip means that a greater percentage of the gland loading forces are efficiently transferred to the primary sealing rings (Preforms 58) located in the center of the packing assembly. To prove this theory, the five-ring packing assembly 56 with its MIC-braided end rings should be able to attain a less than about 500 ppm seal at lower gland loading pressures.

An emission test was conducted, under the same service conditions stated previously, but with only about 3000 psi gland loading. The results were:

| Style | Average Stem Friction Forces | Adjustments | Maximum Leakage | Installation Steps | Gland Load (psi) |
|---|---|---|---|---|---|
| 5 ring 56 (FIG. 4) | 481 lbs. | 0 | 350 ppm | 1 | 3000 |
| 7 ring (FIG. 3) | 650 lbs. | 1 | 1300 ppm | 2 | 3000/4038* |

* = Initial/final (After Adjustment

The five-ring packing assembly 56 with the MIC-braided end rings 64, 66 was able to more efficiently transfer the gland loading forces through the end ring to the Preform sealing rings 58. Its maximum leakage point was about 350 ppm—well under the 500 ppm level dictated by the Clean Air Act. No adjustments were required, and a one-step installation procedure was followed. The seven-ring prior art packing assembly, installed with the superior two-step installation method and with the same about 3000 psi gland loading force, had an initial leak of about 1300 ppm, and required an adjustment to a gland load of about 4038 psi to reduce its leakage to a value under about 500 ppm. The frictional grip formed by the compressible braided end-rings in the seven-ring packing assembly prevented a portion of the about 3000 psi initial gland loading force from efficiently reaching the center Preform sealing rings 38. As a result, the seven-ring packing assembly's Preforms 38 did not receive the compression energy required to radially expand and create a seal comparable to that attained with the five-ring MIC-braid packing assembly 56. Having fewer rings, and having firm conformable end rings 64 66, the five-ring packing assembly 56 including the MIC-braided end rings 64, 66 uses the applied forces more efficiently and effectively.

Stem Friction Comparisons

The following table provides some basic friction force comparison data on the seven ring packing assembly of FIG. 3 and the five ring packing assembly of FIG. 4. Breakaway friction is the force required to start the stem moving on the initial stroke. The second column value is the sliding stem friction factor, measured under hot conditions.

| Style | Initial Stem Breakaway Friction Factor | Stem Friction Factor at 750° F./500 psi |
|---|---|---|
| 7-ring set (FIG. 3) | f = 0.08 | f = 0.06 |
| 5-ring set 56 (FIG. 4) | f = 0.075 | f = 0.049 |

As seen in a previous test, the seven-ring packing assembly outperforms the five-ring flat-ring combination packing assembly of FIG. 1 in frictional performance. This test result shows that the five ring packing assembly of FIG. 4 outperforms the seven-ring packing assembly in both breakaway (green) and in hot friction.

Density Range Advantages of MIC Versus Flexible Graphite Tape

The following is a listing of a number of density values, and the corresponding compressive loading forces that are required to reach those values from an initial flexible graphite tape density of about 0.7 g/cc (about 43.7 lbs./ft$^3$).

| Flexible Graphite Die-Formed Tape Material | |
|---|---|
| Density Value Metric (English) | Compressive Loading Force |
| 0.7 g/cc (43.7 lbs/ft$^3$) | 0 psi |
| 1.0 g/cc (62.4 lbs/ft$^3$) | 350 psi |
| 1.1 g/cc (68.6 lbs/ft$^3$) | 750 psi |
| 1.4 g/cc (87.3 lbs/ft$^3$) | 1900 psi |
| 1.5 g/cc (93.6 lbs/ft$^3$) | 2900 psi |
| 1.6 g/cc (99.6 lbs/ft$^3$) | 3650 psi |
| 1.7 g/cc (106.0 lbs/ft$^3$) | 5000 psi |
| 1.8 g/cc (112.3 lbs/ft$^3$) | 5850 psi |
| 1.812 g/cc (113.0 lbs/ft$^3$) | 6000 psi |

The highest free-standing (free of tension caused by being subjected to compressive loading force) density that applicant has ever witnessed with a die-formed flexible graphite tape ring is about 1.81 g/cc (about 113 lbs/ft$^3$). If a die-formed tape ring density of about 113 lbs/ft$^3$ is desired, the spiral wrapping of about 43.7 lbs/ft$^3$ flexible graphite tape is placed in a mold and compressed under a pressure of approximately 6000 psi. Upon removal, the die-formed tape ring density will be about 113 lbs/ft$^3$. If the tape is die-formed under a higher pressure than about 6000 psi, the density of the tape ring will attain a level higher than about 113 lbs/ft$^3$ as long as it remains under the influence of the compressive loading force. However, upon removal from the die, the die-formed tape ring will immediately relax back to a density of approximately 113 lbs/ft$^3$. About 1.81 g/cc (or about 113 lbs/ft$^3$), therefore, becomes a critical limit when designing the densities of Adapter rings (18, 20, 44, 46) using flexible graphite materials. As long as flexible graphite tape is used as the starting raw material for the Adapter ring, the maximum density obtainable is about 113 lbs/ft$^3$.

The Preform rings (14, 16, 38) are typically produced at a density of about 1.1 g/cc. As mentioned previously, maximizing the density differences between the Preform rings and Adapter rings is critical to maximizing the enhanced radial expansion service life of the packing assembly. A flexible graphite die-formed tape ring will not start to deform, expand, or compress until it is subjected to a compressive load that exceeds its prior experiences.

For example, if an about 1.1 g/cc density Preform ring for the prior art packing assembly of FIGS. 2 and 3 is die-formed under a compressive load of about 750 psi, and then combined with the rest of the ring components in a valve stuffing box, the Preform ring will not deform and begin its expansion movement until the gland follower compressive loading forces exceed about 750 psi. As soon as about 750 psi is exceeded, the ring will being its preferential expansion to either the ID or to the OD, depending upon its design focus.

If the initial seal is acquired as a result of about 3650 psi gland loading compressive force, the Preform ring (subjected to the about 3650 psi gland load) will be at a density of about 1.6 g/cc. If, at a later date, leakage develops and the packing assembly needs additional compression, the Preform ring will being to expand and regain a seal as soon as the compressive loading forces that it experiences exceed about 3650 psi.

Prior art Adapter rings, die-formed from flexible graphite tape, are typically produced at a density of about 1.7 g/cc (about 106 lbs/ft$^3$). About 1.7 g/cc is as close the maximum attainable density level (about 1.81 g/cc) as possible and practical from a manufacturing stand-point. All flexible graphite rings, in all sizes, can be die-formed to about a 1.7 g/cc density; however, attaining the maximum density of 1.81 g/cc in every size on every ring on every production order is not practical. 1.7 g/cc was selected as the maximum density that is routinely achievable for manufacturing consistency. This density level requires a compressive loading force of approximately 5000 psi during the die forming process. The Adapter rings, when combined with other components in a packing assembly, will not experience any significant deformation or expansion until a loading force of about 5000 psi is exceeded.

The gap, or the differences in the densities, that exist between the about 1.1 g/cc flexible graphite tape die-formed Preform rings and the about 1.7 g/cc flexible graphite tape die-formed Adapters is the maximum that is practically achievable using these raw materials. When a prior art packing assembly of FIGS. 2 or 3 is installed in a valve and compressed, the compressive load causes the softer Preform rings (14, 16, 38) to deform and is radially expand to form an ID and OD sealing contact with the valve stuffing box surfaces. The differences in densities (about 1.1 g/cc vs. about 1.7 g/cc) and the differences in angles (about 45° and about 60°) enhance the efficiency of this expansion to a point that is several orders of magnitude beyond the expansion efficiency of standard flat combination-type ring packing assembly of FIG. 1. As the packing assembly is compressed under progressively higher loading forces, the Preform ring (14, 16, 38) angle of about 45° will become deformed to match the 60° angle of the Adapters (18, 20, 44, 46), but the differences in densities will continue to be a property of the packing assembly until a gland loading compressive pressure of about 5000 psi is reached. At approximately 5000 psi, the density of the Preform rings (14, 16, 38) will match that of the Adapter rings (18, 20, 44, 46). When the about 5000 psi point is reached, the expansion efficiency of these prior art packing assembly designs will be reduced to that of a conventional flat-ring combination packing assembly of FIG. 1. This about 5000 psi efficiency barrier, necessary as a result of the limitations inherent in the use of flexible graphite tape material, has served as a counter to the performance, service life, etc. that could have been otherwise enjoyed by industry if higher density, suitably formed, Adapters were available.

Die-forming trials conducted on the MIC-braided material used in the end rings 64 and 66 of FIG. 4 proved that this braided material form, when die-formed into the end ring configuration, could significantly extend the enhanced expansion range of opposing Preform rings 58 well past the 5000 psi barrier. The following table lists some example density vs. force values for the MIC-braided material that are far beyond the capabilities of flexible graphite die-formed tape rings:

| MIC-Braid - Die Formed | |
|---|---|
| Density Value Metric (English) | Compressive Loading Force |
| 1.44 g/cc ( 90 lbs/ft$^3$) | 750 psi |
| 1.68 g/cc (105 lbs/ft$^3$) | 1500 psi |
| 1.84 g/cc (115 lbs/ft$^3$) | 2500 psi |
| 1.96 g/cc (122 lbs/ft$^3$) | 3500 psi |
| 2.12 g/cc (132 lbs/ft$^3$) | 4500 psi |
| 2.18 g/cc (136 lbs/ft$^3$) | 5500 psi |
| 2.22 g/cc (139 lbs/ft$^3$) | 6500 psi |
| 2.28 g/cc (142 lbs/ft$^3$) | 7500 psi |
| 2.32 g/cc (145 lbs/ft$^3$) | 8500 psi |
| 2.36 g/cc (145 lbs/ft$^3$) | 9500 psi |
| 2.40 g/cc (150 lbs/ft$^3$) | 10,500 psi |
| 2.44 g/cc (152 lbs/ft$^3$) | 11,500 psi |
| 2.57 g/cc (160+ lbs/ft$^3$) | 38,000 psi |

As stated previously, the limitation in the enhanced radial expansion capability of the prior art seven and eleven ring packing assembly is due to the density limitation of the flexible graphite tape that is used to produce the Adapter rings. That limitation is about 5000 to about 6000 psi. While the Preform rings are capable of a continuance of their enhanced radial expansion capabilities beyond this about 6000 psi limit, that continuance is only possible if it is compressed against a material that is densified to a correspondingly higher material value. As shown in the above-MIC Braid Table, MIC braided end rings have the capability of being die-formed to densities as high as about 160+ lbs/ft$^3$. In order to attain this density value, compressive loading forces of about 38,000 psi are required in die-forming. The compressive loading force value shown for about 160+ lbs/ft$^3$ was measured as a result of die-forming about 1"× about 1½" MIC rings. 1"× about 1½" rings have a surface area of about 0.982 in$^2$. If this same loading force was applied to an about ½"× about ¾" ring (surface area of about 0.245 in$^2$), the effective die-forming pressure would be over about 150,000 psi and end ring densities of about 170 lbs/ft$^3$ would be attainable. In the case of an about 1×about 1½ packing assembly size, against MIC-braided end rings, die-formed to about 160 lbs/ft$^3$, the Preform enhanced radial expansion capabilities will be enhanced to cover a compressive loading pressure range of about 750 psi to about 38,000 psi.

The valve packing assembly is often the weak link in the service range and service life capabilities of a valve. Even a premium performance valve packing assembly, like the prior art packing assembly of FIG. 3, can not offer enhanced expansion and material flow beyond about 6000 psi. With standard Preform rings 58 mated and matched to MIC braided end rings 64 and 66, the five ring stuffing box packing assembly 56 of FIG. 4 can offer enhanced performance features to levels as high as about 38,000 psi; well beyond the capabilities of current prior art packing assemblies.

While prior art carbon compressible braided end-rings are less expensive, and have a greater resistance to fracturing damage, as a result of heavy applied gland loading forces, than compressible graphite yarn rings, the carbon yarn braids do not have the high temperature exposure resistance of the graphite. The graphite yarn braids can withstand exposures to about 1200 F. with little or no detrimental effect, while the carbon yarns will suffer some small deterioration at constant exposures above 1100 F. The graphite yarn braids are considerably more expensive, but will suffer fracturing damage readily at gland loading pressures in excess of 4000 psi. Carbon compressible braids are unaffected by fracturing damage well in excess of 4000 psi.

The end rings 64 and 66 for the five ring stuffing box packing assembly 56 are Inconel MIC-braided end-rings composed of pure graphite and Inconel. Specifically, MIC-braid end rings, presently preferably, comprise about sixty eight (68%) percent flexible graphite foil, about thirty two (32%) Inconel™ with the carbon assay of the flexible graphite being about ninety five (95%) or more. It may be possible to use a lower percentage of about fifty (50%) percent of flexible graphite and one having a lower percentage of carbon assay of about seventy (70%) to about ninety nine and one half (99.5%) percent. The amount of flexible graphite used could vary between a high of about eighty five (85%) percent and a low of about fifty (50%) percent with the percent of the Inconel™ being correspondingly adjusted therewith The temperature resistance properties of the MIC-braid are equal to the compressible graphite yarn end-rings, but due to the metal inserts, they have fracture resistance properties in excess of that of the graphite compressible yarn braids. The result is that the packing assembly 56 can withstand elevated temperature/high pressure exposures beyond that of any of the conventionally available packing assembly of the prior art.

As originally conceived, the above described five ring stuffing box packing assembly has proven effective in valves that actuate the entire length of the valve stem or nearly the entire length. However, when this particular five ring packing assembly was used in valves for certain applications, such as, for example, control valves shortcomings have been observed. Control valves, unlike conventional on-off type valves where the valve stem moves through its entire length between a fully open and a fully closed state, usually are used to modulate the volume of flow through a piping system. In these modulating applications, the stem in the control valve may spend the majority of its time actuating through only about ten percent (10%) to about twenty percent (20%) of the available stem stroke length. In this environment, the typical braided end ring/flexible graphite center ring combination packing assembly that utilizes braided end rings on the top and bottom of the packing assembly to function as wiper components to reduce the chances of graphite particles being transported out of the box environ as a result of stem travel has been found to be wanting. As described above, if a valve actuates through its entire stem length, this wiping action comes effectively into play every time the valve is operated. However, in control valves that devote the majority of their functional service lives to very short stem actuations that may be only one to two cross-sections (or less) of the rings in stem travel length, thus, much of the stem surface area that passes through the stuffing box chamber does not come into contact with an end wiper ring during these short stem activations.

Since, when only end wiper rings are used, the wiping action occurs only at the ends of the packing assembly. If graphite particles detach from flexible graphite ring material in the center of the packing assembly and are transported by way of the stem surface movement to the ends of the packing assembly where the wiping action takes place, this transference activity will tend, over a period of time, to leave voids in the center packing assembly area due to material displacement. No graphite material will be lost from the stuffing box as a unit, the distribution of sealing material throughout the stuffing box will gradually be altered as a steadily increasing proportion of the material becomes concentrated on the ends of the stem next to the wiper rings.

Figure 5:
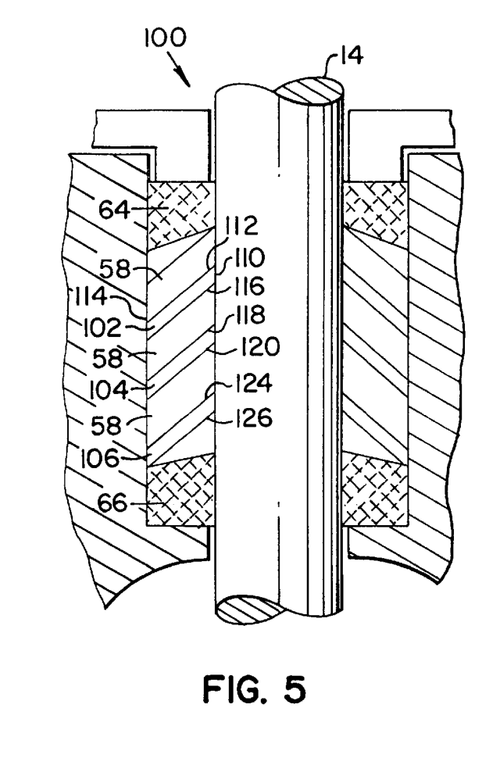
FIG. 5 is a cross sectional view through a stuffing box, stem and an alternative stuffing box packing assembly of the present invention.

In an effort to eliminate or at least minimize these problems, one alternative design was developed, as illustrated in FIG. 5. This alternative stuffing box packing assembly design, for use primarily with control valves having relatively short activation strokes compared to the overall stem length, contains the same Adapter 64, 66 and Preform 58 components as described in the above arrangement. In addition to the above described components, metal reinforced flexible graphite braided ring or MIC-braid Preform support rings 102, 104, 106 that has been die-formed to be typically about ⅛" thick, is placed below each of the Preform rings 58. As a result, as shown in FIG. 5, each Preform ring 58 is sandwiched between a pair of MIC-braid Preform support rings 102. The MIC-braid Preform support rings 102, 104, 106 so positioned have the same about 45° concave-convex angles as the Preform rings 58 that they contact. Presently preferably, the thickness of these MIC-braid Preform support rings 102, 104, 106 can vary (from about ⅟₁₆" thick to a full cross-section in thickness or greater) depending on the particular functional and design needs of a specific stuffing box packing assembly. While the specific embodiment shown contains eight (8) ring components (two Adapter or end rings 64, 66, three Preform rings 58, and three MIC-braid Preform support rings 102, 104, 106), and has a packing assembly stack height of five cross-sections +about ⅜, the number of Preform rings and the number of MIC-braid Preform support rings components and the ring individual thickness or axial height can vary depending upon the functional and design needs of a specific valve stuffing box dimension and the specific application that is involved. In fact, it is presently believed not necessary to include the third MIC-braid Preform support ring 106 adjacent the end ring 66, as shown in FIG. 5.

It has been found that by altering the design of the five ring stuffing box packing assembly 56 of FIG. 4 to include additional MIC-braid Preform support rings 102, 104, 106 corrects the above described deficiencies. In the configuration shown in FIG. 5, it has been found that the braided support rings perform as internal wiper components, and any stem 14 travel that is greater than about one half to about one cross-section of one Preform ring 58 will bring all the surfaces of the stem into contact with at least one of the MIC-braid Preform support rings or wiper rings 102, 104, 106. Having the MIC-braid support rings 102, 104 on either side of the individual Preform rings 58 also keeps the flexible graphite material compartmentalized within the cross-section of each individual Preform ring i.e. no migration of flexible graphite material can occur towards the extreme ends of the packing assembly 100. The about 45° concave-convex angles of the MIC-braid Preform support rings 102, 104, 106 supports, and does not diminish, the enhanced radial expansion attributes of the packing assembly's differing angles and differing densities design.

Specifically, the end rings 64, 66 are very hard, thus, the bottom surface of the bottom Preform ring 58 and the top surface of the top Preform ring 58 are going to deform more than the soft, unsupported material that is in the middle part of the Preform ring assembly. What is believed to occur in the embodiment of FIG. 5 versus FIG. 4 is the MIC-braid Preform support rings 102, 104 positioned between the Preform components 58 are rigid or relatively rigid like the MIC-braid end rings 64, 66 in that they have a much higher density than the Preform ring 58. Thus, as the load increases, the 45 degree angle of the center Preform rings 58 are forced toward the 60 degree angle of the end ring 64 at the top of the assembly 100, the contact therebetween initiates deformation of the first Preform ring 58 in the immediate proximity thereof. This is believed to result in a much more uniform, efficient load transfer from one Preform ring 58 to the next Preform ring 58 to the next Preform ring 58 because of the reinforcement hard MIC-braid Preform support rings 102, 104 in between the Preforms 58. Thus, upon tightening, the hard MIC-braid Preform support rings 102, 104, 106 will actually move as will the Preform rings 58. Being a harder material, the MIC-braid Preform support rings 102, 104, 106, positioned between and adjacent the softer Preforms 58 will have a tendency to force all three of the soft Preform components 58 to move more toward a 60 degree angle than they would otherwise move without the MIC-braid Preform support rings being positioned between each Preform 58, as shown in FIG. 4.

When compressed between the MIC-braided end rings 64, 66, all five of the rings, at least two MIC-braided Preform support rings 102, 104 and possibly the third 106 and the three Preform rings 58, positioned between the MIC-braided end rings 64, 66 rotate relative to the stem 14 such that the gap between the end ring 64 and the first Preform ring is closed. Thus, the portion 110 of the MIC-braided Preform support ring 102/Preform ring 58 interface line 112 closest to the stem 14 is initially located higher relative the stem 14 would rotate down as well as the outer portion 114 of the MIC-braided Preform support ring 102/Preform ring 58 interface line would rotate up toward the open part of the stuffing box. In other words, the interface lines would move along the stem surface toward the bottom away from the top of the stuffing box and the outer edge of the 45 degree angle would move upward toward the top and away from the bottom of the stuffing box. So essentially all MIC-braid ring-Preform support rings/Preform ring interface lines 110, 112, 116-126 would move and possibly, at some point, might even become perpendicular to the stem 14. The basic radial expansion properties of the differing angles between the various components is important in each of the illustrative embodiments and is instrumental in providing the advantages of the embodiment of FIG. 5.

As described above, the MIC-braid Preform support rings 102, 104, 106 made of flexible graphite are die-formed and have a density and rigidity that is typically greater than the Preform rings 58. The typical density of the Preforms 58 is about 0.50 to about 1.4 g/cc. The presently preferred density of the MIC-braid Preform support rings 102, 104, 106 is about 1.8 g/cc or higher. The inclusion of the MIC-braid Preform support rings to the interior of the stuffing box packing assembly also provides additional stem guidance/bearing support benefits, helping to ensure that the stem 14 remains centered on its axis during actuations. The density of the Preform rings 58 alone has proven insufficient to make any significant contribution to the stem guidance/bearing support functions.

EXAMPLE 1

Two functional testing examples to qualify the advantages of the stuffing box packing assembly as illustrated in FIG. 5 is described below. One example test utilizes a continuously actuating control valve test fixture, and the other test example utilizes a test fixture where the valve stem is repetitively actuated through its full stroke distance.

Control Valve Test

The test rig used in this test was a four inch (4") three hundred lb. (300 lb.) class Serk Glocon valve that was set up to actuate through about ten percent (10%) of its stem travel distance, with the stem travel being centered on its mid-point (common service actuation conditions). During the test the stem was actuated about six half cycles/min., with about a ten (10) second dwell between cycles. Temperature/pressure/media conditions recorded during the test were about 392 ° F., about 654 psi, with methane. A Foxboro sniffer was used to measure emission leakage rates. The goal of the test was to determine and record the number of stem actuations that could be accumulated until the leakage emission readings exceeded 10,000 ppm for three different stuffing box packing assemblies. The test results are shown below:

1. A five ring, flat combination stuffing box packing assembly of FIG. 1.
   Leakage surpassed 1000 ppm after 32 hours,
   Leakage surpassed 5000 ppm after 52 hours, and
   Leakage surpassed 10,000 ppm after 78 hours.
2. A seven ring stuffing box packing assembly of FIG. 3
   Leakage surpassed 1000 ppm after 68 hours, Leakage surpassed 5000 ppm after 102 hours, and
   Leakage surpassed 10,000 ppm after 126 hours.
3. A stuffing box packing assembly as shown in FIG. 5.
   Leakage surpassed 1000 ppm after 355 hours,
   Leakage surpassed 5000 ppm after 410 hours, and
   Leakage surpassed 10,000 ppm after 455 hours.

As is known, graphite particle transfer to the stem has an abrasive effect on the flexible graphite packing rings, causing grooves to the scored into the packing ring ID sealing surfaces. With the continued accumulation of graphite build-up on the stem surface, these grooves become progressively larger, allowing greater quantities of media to leak through to the outside environ. As can be seen in the above comparative test results, the seven ring stuffing box assembly does provide a significant functional performance improvement over the five ring flat combination stuffing box assembly. Because, the wiper rings on the seven ring packing assembly design and the five ring combination packing assembly design are located on the ends of the packing assembly, their positioning eliminates their usefulness in preventing graphite particle build-up from occurring in the center of the packing assembly/stem sealing area. As a result the wiping action in the center of the assembly is at best quite limited. In addition, some transference of graphite material must have occurred toward the extreme ends of both these packing assemblies over the course of the stem actuations.

As can be seen the performance of the packing assembly of FIG. 5 showed a very dramatic improvement over the results of the five ring flat combination packing assembly, and a significant improvement over the results of the seven ring packing assembly. This improvement is believed due to the internal wiping effect of the three additional strips of MIC-braid Preform support rings resulting in: better wiping action, better compartmentalization of the graphite, better stem guidance support and better sealing results.

Valve Test—Stem Cycling Through Full Stroke Length Distances (Simulating Motor Operated Valve Applications)

This valve test used a Pacific valve test rig with a motor operated actuator. The media used was methane at about 392° F. and about 564 psi. The valve stem was repetitively cycled between the full open position and the full closed position. No more than two readjustments of the packing sets were allowed during the course of the test. The test goal was to determine the number of stem strokes that could be accumulated before leakage exceeded 10,000 ppm for each of the stuffing box packing assemblies being tested.

1. Five ring flat combination packing assembly of FIG. 1:
   Leakage exceeded 10,000 ppm after 2300 cycles.
2. Seven ring packing assembly of FIG. 3:
   Leakage exceeded 10,000 ppm after 6000 cycles.

3. Packing assembly of FIG. 4:
   Leakage exceeded 10,000 ppm after 6500 cycles.
4. Packing assembly of FIG. 5:
   Leakage exceeded 10,000 ppm after 28,500 cycles.

The reasons for the performance improvements of the packing assembly of FIG. 5 versus the other packing assemblies are the same as that stated previously in the above test conclusions. Better compartmentalization control was believed primarily responsible for the increased improvement seen in this test, versus improvement shown in the previous test. These results also demonstrated the functional advantages that the packing assembly of FIG. 5 has over the standard design of FIG. 4.

Figure 6:
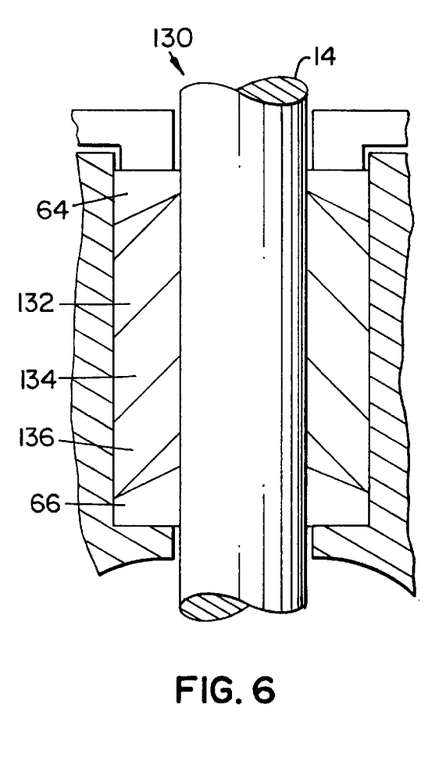
FIG. 6 is a cross sectional view through a stuffing box, stem and a second alternative stuffing box packing assembly of the present invention.

A second alternate stuffing box packing assembly embodiment is illustrated in FIG. 6. The packing assembly 130 illustrated in FIG. 6 is constructed entirely from die-formed MIC-braid braided material—the same type material that is used in the construction of the Adapter rings 64, 66 in the packing assembly 56 of FIG. 4. The presently preferred yarn material used with these MIC-braid internal or center rings 132, 134, 136 is one that is constructed principally of flexible graphite foil or flake material. The yarn also incorporates one or more metallic strand(s) (e.g., foil strip, wire filament, etc.) within, on, or surrounding its body.

As is known, flexible graphite itself is an outstanding sealing material that has a broad temperature and chemical resistance capability range. Flexible graphite forms an excellent sealing contact against metal surfaces, is non-abrasive, and is conformable. However, flexible graphite also has some negative attributes, such as, for example, poor abrasion resistance, poor radial recovery when subjected to side-loading forces (poor bearing support properties), and it readily extrudes through small clearances when subjected to dynamic movement or compressive loading forces.

When a metallic reinforcement is added to the flexible graphite yarn, most of the above negative properties are eliminated. In the presently preferred yarn structure used in MIC-braid of FIG. 6, a skeletal knit of encapsulating Inconel filament (about 0.0035" dia.) wire over a flexible graphite foil core, the finished braided product was found to be non-abrasive and have good sealing properties and to exhibit high abrasion resistance, excellent extrusion resistance, and was an excellent bearing support material.

The packing assembly of FIG. 6 uses die-formed MIC-braid flexible graphite braided rings for all of its Adapter or end ring 64, 66 and Preform components/rings 132, 134, 136. The particular packing assembly 130 was developed to counteract the problem attributes that are inherent in quarter turn (or rotary) valve applications. Quarter turn valves have stems that usually actuate through a rotary 90° arc about the stem axis (vs. the reciprocating or linear stem motion that is commonly used in knife, gate, and globe valves). The act of applying a force to the top of the stem 14 to create this rotational motion inherently applies a certain degree of side-loading to the stem 14 that results in a radial compaction force being exerted against the packing material. When die-formed flexible graphite rings like 58 (non-reinforced) are used as sealing materials, this side-loading creates radial compression of the sealing material with little to no radial recovery occurring when the stem 14 returns to its centered position. The resultant gap opens up obvious leakage paths that will shorten the sealing and service life of the packing assembly. Die-formed combination packing assemblies that use flexible graphite tape rings in the center of the assembly are frequently the sealing choice for linear stem movement applications, but the above problem severely limit their selection for rotary applications.

Providing a packing assembly variation that has MIC-braid flexible graphite die-formed braided rings as the principle seal member effectively counters the above-mentioned side-loading issue. The reinforced density of the MIC-braided Preform rings 132, 134, 136 in the packing assembly of FIG. 6 provides a high degree of bearing support to the stem 14, and effectively counters stem radial movement during valve actuations. This enables the full benefit of the sealing attributes of flexible graphite materials to be enjoyed in rotary valves without having to experience the counteracting poor radial recovery disadvantage.

As is known, graphite has a functional attribute that is called graphite particle transfer. This means that, when graphite is compressed against a moving metal surface, particles of graphite will shear off and affix themselves to the metal surface itself. While this property has a number of advantages (e.g. friction reduction, metal surface micro-polishing, etc.), it also encourages a gradual transport of graphite out of the sealing chamber with every linear actuation that a gate, globe, or knife valve makes. It has become a common practice in such cases to use braided wiper rings on the opposing ends of the flexible graphite containing sets to counter this graphite particle transfer. The wiper rings keep the flexible graphite material trapped within the confines of the stuffing box. While the addition of the wiper system works quite well for valves with stems that travel in a linear fashion, the use of end wiper components or internal wiper components 102, 104, 106, as in FIG. 5, to reduce graphite particle transfer in rotary motion valves is useless. Due to the motion of the stem 14, the wipers 64, 66 on the ends of the assembly 100 will never come into play. As graphite particle build-up occurs on the stem 14, movements of the stem result in the scoring of circumferential grooves into the ID sealing surfaces of the remaining flexible graphite sealing rings 58. The flexible graphite material abrades itself, and the resultant grooves create leakage paths through the sealing packing assembly.

In the packing assembly 130 of FIG. 6, the flexible graphite yarns that are used to produce the braid contain their own metal reinforcement strand structure that is intimate to each strand of yarn. The presence of this metal reinforcement in the structure of the braid performs an excellent job in acting as an effective built-in wiper system against rotary motion stems. Any graphite that affixes itself to the stem surface will be wiped off before it can travel the width of a single braided yarn strand.

Previously, due to the above two problem areas, the compression packing industry has had to depend largely on conventional braided packing sets (using carbon or graphite filament-based yarn systems) as the preferred sealing products for rotary services. While the superior performance capabilities of the flexible graphite products has been widely acknowledged, the above two problem areas (poor radial recovery or bearing support attributes, and the absence of an effective wiper system) have limited flexible graphite's use in rotary services. With the packing assembly 130 of FIG. 6, both problem areas are effectively eliminated, the performance advantages of flexible graphite is fully enjoyed.

EXAMPLE 2

In a comparative functional testing evaluation, comparative tests were conducted using an industry common rotary valve with two different packing assembly designs:
1. The Packing Assembly similar to that of FIG. 6, but having only two (2) center rings and
2. a four ring flat combination packing assembly similar to that of FIG. 1 but having only two (2) center flexible graphite packing rings.

The combination packing assembly (FIG. 1) consisted of top and bottom braided carbon anti-extrusion end rings with two square cross-section flexible graphite center rings. The flexible graphite rings did not contain a ring metal reinforcement, and were die-formed to a density of about 1.4 g/cc to maximize their balance of sealability and bearing support properties. The test rig used was a Kuka 3"150# class ball valve with a Unitorq M148 DA actuator. The system was pressurized with water at 300 psi. The goal of the test was to actuate the valve through quarter-turn stem cycles (6 stem cycles/min. or 3000 stem cycles/day) until such time that seepage of water was detected escaping from the stuffing box. The results of the test were as below:

In the four ring flat combination packing assembly similar to that of FIG. 1, water leakage was present, in a detectable and collectable amount, on the top of the stuffing box at 10,000 stem cycles. An examination of the packing gland and stem surfaces after the test showed that a significant degree of graphite particle build-up hadoccurred on the stem surface, and the stem had undergone galling damage as a result of its side-loading contact with the gland follower.

In the packing assembly similar to that of FIG. 6, no water seepage was detected with the test being finally curtailed after 100,059 stem cycles. An examination of the packing gland and stem surfaces after the test revealed no signs of wear or graphite build-up.

It is believed that the packing assembly similar to that of FIG. 6 was able to provide the necessary bearing support to keep the stem 14 centered in its axis, and the metallic reinforcement in the flexible graphite ring components prevented graphite particle build-up from occurring.

With regard to linear stem movement valves, this stem bearing support feature, while critical to performance in rotary valves, is also a very valuable functional feature in many linear stem movement valves. Due to wear, mistakes or errors in machining control or precision, misalignment of the valve to actuator connection, etc., linear stem travel valves will often have their sealing performances improved if additional bearing support components (e.g., bushings, junk rings, bearing blocks, etc.) are added to the packing assembly. If the stuffing box is sufficiently deep, the necessary room for these additional components is readily available. However, it has become common place in the industry for new stuffing boxes to have shallow (five rings or less) stuffing box depths.

The packing assembly 130 of FIG. 6 has a unique advantage in that the sealing components also function as bearing support components. Thus, when using a packing assembly similar to that of FIG. 6, shallow box designs are no longer a concern in this regard. The packing assembly 130 of FIG. 6 has advantages in linear and rotational valve services, and the height of the packing stack can be varied anywhere from a two cross-section deep set and up, depending on the die-formed thickness of the ring components and how many rings are incorporated into an packing assembly. It should be understood that the packing assembly of FIG. 6 also has radial expansion enhancement advantages due to the differing angles.

Figure 7:
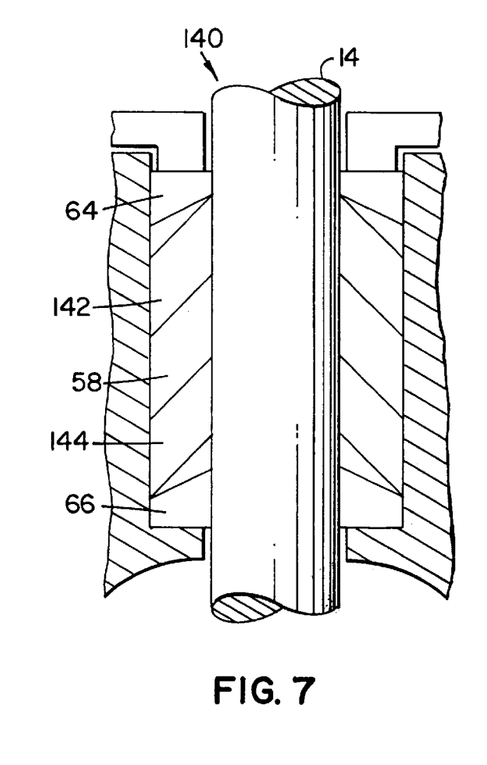
FIG. 7 is a cross sectional view through a stuffing box, stem and a third alternative stuffing box packing assembly of the present invention.

The stuffing box packing assembly 140 illustrated in FIG. 7 is a combination of the stuffing box packing assemblies illustrated in FIGS. 5 (100) and 6 (130). As shown in FIG. 7, the top 142 and bottom 144 Preform rings are MIC-braid Style #1303 die-formed concave-convex rings and only the central Preform ring 58 is constructed of die-formed flexible graphite tape.

As with the packing assemblies of FIGS. 5 and 6, this particular arrangement of the more dense, die formed MIC-braid Preform support rings 142, 144 provides for improved wiping and better bearing support. This particular packing assembly is useful in non-rotary applications having poorly designed bearing support which causes the stem to have a tendency to move through a rocking movement as it actuates. The packing assembly 140 illustrated in FIG. 7 provides the needed additional bearing support to keep the stem relatively centered in the stuffing box.

Occasionally, certain industry valve applications fail to provide acceptable sealing performances in spite of the fact that they have been properly packed with premium performance valve packing assembly designs that were correctly selected for the chosen application. The reasons for the lack of performance can be many and various (e.g., mechanically damaged valve components, service exposure conditions that were unforeseen and unplanned for, etc.). One particular cause that is frequently encountered in these cases involves stems that actuate outside of the center axis of the stuffing box. This out of alignment actuation problem may be due to the induction of side loading or displacement movement as a result of actuator forces, a rocking motion as a result of wear of the valve bonnet yoke nut threading, a stem that is machined in misalignment with the center axis of the stuffing box, a large diameter valve stem that has a horizontal axis (with most of the stems weight being supported by the stuffing box packing set), etc. If the stuffing box is sufficiently deep, these misalignment issues can be corrected through the use of additional bearing support devices such as bushings, bearing blocks, etc. Unfortunately, and on a steadily increasing basis, these valves also have shallow box depths that are insufficient to incorporate the use of additional bearing support components.

It has been found that the packing assembly 140 design as illustrated in FIG. 7 eliminates the need for this additional box depth requirement and/or for any additional bearing support componentry. As illustrated in FIG. 7, the packing assembly 140 has five rings including two dense MIC-braid Adapter end-rings 64, 66 and two dense MIC-braid Preform rings 142, 144. These four rings 64, 66, 142, 144 provide an enhanced degree of bearing support to any stems, sleeving, or shafting that they contact.

The packing assembly 140 illustrated in FIG. 7 provides enhanced sealability features, in that, the two high density MIC-braid Preform rings 142, 144, and one low density center flexible graphite Preform ring 58, are all at differing angles from the MIC-braid Adapter end rings 64, 66. The differing angles ensure enhanced radial expansion as a result of applied compressive loads. The embodiment shown in FIG. 7 nullifies the need for separate sealing components and separate bearing support components, as both of these functions are provided by the multi-role components that are present in this design.

Having a single flexible graphite (non-reinforced) Preform ring 58, enclosed on either side by a MIC-braid high density Preform ring 142, 144, makes the design of FIG. 7 suitable for use in control valves where the interior wiper benefits disclosed in the discussion of the packing assembly 100 of FIG. 5 would be advantageous.

The packing assembly design illustrated in FIG. 7 would also be a very appropriate choice for valves having shallow stuffing boxes that require optimum sealability results from application environments that are also highly abrasive (e.g., chemical slurry applications). The two MIC-braid Adapter end rings 64, 66 and the two MIC-braid Preform rings 142, 144 would provide enhanced abrasion resistance support to keep the abrasive media from contacting and deteriorating the softer center flexible graphite Preform ring 58.

It should be understood that the individual thicknesses of the various rings 64, 66, 142, 144, 58 that are shown in FIG. 7 can be varied to alter the stack height of the finished packing assembly in accordance with the requirements of any particular valve stuffing box design.

As is clear, the valve industry has seen a steady evolution in the performances that can be derived from valve stuffing box packing assemblies. This evolution has moved from the asbestos braided styles to, the carbon and graphite braids to, the combination packing assembly designs (FIG. 1) to, the cup-and-cone combination packing assembly technology, such as, for example, 11 component EVSP assemblies (FIG. 2), 7 component EVSP assemblies (FIG. 3). In each case, performance improvements were achieved; and in most cases, the design of the sealing packing assembly became simpler and more easily applied to valve maintenance practices in that positioning the packing assembly in the stuffing box was easier and required less time and labor. Stuffing box packing assemblies illustrated in FIGS. 4–7 are examples of further evolution and have produced better performance results (than the prior art packing assemblies) utilizing new packing assembly designs that include multi-role components that can be fitted into progressively shallower stuffing box cavities.

While the articles described herein constitute preferred embodiments of the invention, it is to be understood that the invention is not limited to these precise articles and that changes may be made therein without departing from the scope of the invention which is defined in the appended claims.

What is claimed is:

1. A packing for a stuffing box comprising:
    at least one center ring; and
    an end ring, responsive when axial compressive force is applied to the packing, for forcing the material adjacent one radial edge of a first end of one the at least one center ring to move axially and radially in a direction away from the at least one center ring and for further compressing the material into an impervious and effective seal, the end ring comprising:
        braided graphite tape stock having a density of at least about 1.8 g/cc; and
        inserts, operatively dispersed throughout the braided graphite tape stock.

2. The packing of claim 1 wherein a first end of the end ring forms an ID seal and wherein acute angles are formed in the axially inner direction, and wherein the acute angles of the at least one center ring and end ring facing surfaces are about 45° and 60°, respectively.

3. The packing of claim 1 wherein the end ring has a high resistance to extrusion and abrasion.

4. The packing of claim 1 wherein the end ring both supports the at least one center ring and wipes a valve stem.

5. The packing of claim 1 wherein the at least one center ring comprises:
    three low density graphite preform rings having angled facing surfaces operatively positioned between two end rings.

6. The packing of claim 1 wherein the at least one center ring comprises:
    at least two low density graphite preform rings; and
    at least one additional ring operatively positioned therebetween, the at least one additional ring comprising:
        braided graphite tape stock having a density of at least about 1.8 g/cc; and
        inserts, operatively dispersed throughout the braided graphite tape stock having angled facing surfaces operatively positioned between two end rings.

7. The packing of claim 1 wherein the at least one center ring comprises:
    at least three low density graphite preform rings having angled facing surfaces operatively positioned between two end rings; and
    at least one additional ring operatively positioned between adjacent low density preform rings, the at least one additional ring comprising:
        braided graphite tape stock having a density of at least about 1.8 g/cc; and
        inserts operatively dispersed throughout the braided graphite tape stock having angled facing surfaces operatively positioned between two end rings.

8. The packing of claim 1 wherein the at least one center ring comprises:
    one low density graphite preform ring having angled facing surfaces operatively positioned between two additional rings, the additional rings being operatively positioned between two end rings, the additional rings comprising:
        braided graphite tape stock having a density of at least about 1.8 g/cc; and
        inserts, operatively dispersed throughout the braided graphite tape stock having angled facing surfaces operatively positioned between two end rings.

9. The packing of claim 1 wherein the at least one center ring comprises:
    at least three rings, each of the rings comprising:
        braided graphite tape stock having a density of at least about 1.8 g/cc; and
        inserts, operatively dispersed throughout the braided graphite tape stock having angled facing surfaces operatively positioned between two end rings.

10. The packing of claim 1 wherein the inserts in the braided graphite tape stock comprise:
    strips, wires, filaments or tinsels of metal capable of performing the support spacer and wiper functions.

11. The packing of claim 10 wherein the metal is selected from the group comprising:
    steel, copper, brass, aluminum and zinc.

12. The packing of claim 1 wherein the end ring comprises: metal-inserted conformable braided stock with nickel-chromium alloy stainless steel.

13. The packing of claim 1 wherein the inserts rigidly hold and conform the end rings into virtually any desired shape.

14. The packing of claim 1 wherein each end ring is die formed at compressive loading values within a range of from about 750 psi to about 38,000 psi.

15. A packing for a stuffing box comprising:
    at least two low density center rings;
    at least one additional ring operatively positioned therebetween, the at least one additional ring comprising:
        braided graphite tape stock having a density of at least about 1.8 g/cc; and
        inserts, operatively dispersed throughout the braided graphite tape stock, having angled facing surfaces; and
    an end ring, responsive when axial compressive force is applied to the packing, for forcing the material adjacent one radial edge of a first end of one of the at least two low density center rings to move axially and radially in a direction away from one of the at least two center rings and for further compressing the material into an impervious and effective seal, the end ring comprising:
        braided graphite tape stock having a density of at least about 1.8 g/cc; and
        inserts, operatively dispersed throughout the braided graphite tape stock.

16. The packing of claim 15 wherein a first end of the end ring forms an ID seal wherein the acute angles are in the axially inner direction, and wherein the acute angles of the at least one center ring and end ring facing surfaces are about 45° and 60°, respectively.

17. The packing of claim 15 wherein the end ring has a high resistance to extrusion and abrasion.

18. The packing of claim 15 wherein the end ring both supports the at least one center ring and wipes a valve stem.

19. The packing of claim 15 wherein the inserts in the braided graphite tape stock comprise:

strips, wires, filaments or tinsels of metal capable of performing the support spacer and wiper functions.

20. The packing of claim 15 wherein the end ring comprises: metal-inserted conformable braided stock with nickel-chromium alloy stainless Steel.

21. A packing for a stuffing box comprising:
at least three low density graphite perform rings having angled facing surfaces operatively positioned between two end rings;
at least one additional ring operatively positioned between adjacent low density preform rings, the at least one additional ring comprising:
braided graphite tape stock having a density of at least about 1.8 g/cc; and
inserts, operatively dispersed throughout the braided graphite tape stock having angled facing surfaces; and
an end ring, responsive when axial compressive force is applied to the packing, for forcing the material adjacent one radial edge of a first end of one of the at least three low density center rings to move axially and radially in a direction away from one of the at least three center rings and for further compressing the material into an impervious and effective seal, the end ring comprising:
braided graphite tape stock having a density of at least about 1.8 g/cc; and
inserts, operatively dispersed throughout the braided graphite tape stock.

22. The packing of claim 21 wherein a first end of the end ring forms an ID seal wherein the acute angles are in the axially inner direction, and wherein the acute angles of the at least one center ring and end ring facing surfaces are about 45° and 60°, respectively.

23. The packing of claim 21 wherein the end ring has a high resistance to extrusion and abrasion.

24. The packing of claim 21 wherein the end ring both supports the at least one center ring and wipes a valve stem.

25. The packing of claim 21 wherein the inserts in the braided graphite tape stock comprise:
strips, wires, filaments or tinsels of metal capable of performing the support spacer and wiper functions.

26. The packing of claim 21 wherein the end ring comprises: metal-inserted conformable braided stock with nickel-chromium alloy stainless steel.

27. The packing of claim 21 wherein each end ring is die formed at compressive loading values within a range of from about 750 psi to about 38,000 psi.

28. A packing for a stuffing box comprising:
a center ring assembly, the center ring assembly comprising:
one low density graphite preform ring having angled facing surfaces;
two preform support rings, the low density graphite preform ring being operatively positioned between the two preform support rings, the two preform support rings comprising:
braided graphite tape stock having a density of at least about 1.8 g/cc; and
inserts, operatively dispersed throughout the braided graphite tape stock; and
an end ring, responsive when axial compressive force is applied to the packing, for compressing the material into an impervious and effective seal, the end ring comprising:
braided graphite tape stock having a density of at least about 1.8 g/cc; and
inserts, operatively dispersed throughout the braided graphite tape stock.

29. The packing of claim 28 wherein each end ring is die formed at compressive loading values within a range of from about 750 psi to about 38,000 psi.

30. A packing for a stuffing box comprising:
at least three center perform rings, the at least three center preform rings comprising:
braided graphite tape stock having angled facing surfaces and having a density of at least about 1.8 g/cc; and
inserts, operatively dispersed throughout the braided graphite tape stock; and
at least two end ring, responsive when axial compressive force is applied to the packing, for forcing the material adjacent one radial edge of a first end of one of the at least the center rings to move axially and radially in a direction away from one of the at least three center rings and for further compressing the material into an impervious and effective seal, the at least two end rings comprising:
braided graphite tape stock having a density of at least about 1.8 g/cc; and
inserts, operatively dispersed throughout the braided graphite tape stock.

* * * * *